US008411570B2

(12) United States Patent
Wu et al.

(10) Patent No.: US 8,411,570 B2
(45) Date of Patent: Apr. 2, 2013

(54) SERIAL CLUSTERING

(75) Inventors: David Tze-Si Wu, Fremont, CA (US);
Nitin Gupta, San Francisco, CA (US);
Kand Ly, Richmond, CA (US)

(73) Assignee: Riverbed Technologies, Inc., San Francisco, CA (US)

( * ) Notice: Subject to any disclaimer, the term of this patent is extended or adjusted under 35 U.S.C. 154(b) by 1160 days.

(21) Appl. No.: 11/494,352

(22) Filed: Jul. 26, 2006

(65) Prior Publication Data
US 2007/0053297 A1 Mar. 8, 2007

Related U.S. Application Data

(60) Provisional application No. 60/704,020, filed on Jul. 28, 2005.

(51) Int. Cl.
*H04L 12/26* (2006.01)
(52) U.S. Cl. .......................... 370/235; 709/232
(58) Field of Classification Search .................. 709/230, 709/232, 235; 370/229, 235
See application file for complete search history.

(56) References Cited

U.S. PATENT DOCUMENTS

| | | | |
|---|---|---|---|
| 5,371,852 A | 12/1994 | Attanasio et al. | |
| 6,415,329 B1 | 7/2002 | Gelman et al. | |
| 2001/0037396 A1* | 11/2001 | Tallegas et al. ............... | 709/230 |
| 2002/0062333 A1 | 5/2002 | Anand et al. | |
| 2002/0141401 A1* | 10/2002 | Albert et al. .................. | 370/389 |
| 2002/0188751 A1* | 12/2002 | Hansen .......................... | 709/235 |
| 2004/0066783 A1* | 4/2004 | Ayyagari ....................... | 370/395.3 |
| 2005/0063307 A1* | 3/2005 | Samuels et al. ............... | 370/235 |
| 2005/0276223 A1* | 12/2005 | Maggi et al. .................. | 370/235 |
| 2005/0281196 A1* | 12/2005 | Tornetta et al. ............... | 370/235 |
| 2006/0187884 A1* | 8/2006 | Ma et al. ....................... | 370/332 |
| 2006/0280181 A1* | 12/2006 | Brailas et al. ................. | 370/392 |

OTHER PUBLICATIONS

International Search Report PCT/US06/29082.
Knutsson Bjorn et al., "Transparent Proxy Signalling," 1999, *Journal of Communications and Networks*, ISSN 1229-2370, vol. 3, No. 2, pp. 164-174.
Rodriguez, Pablo, et al., "TPOT: Translucent Proxying of TCP," Feb. 2001, *Computer Communications*, vol. 24, No. 2, pp. 249-255.
Supplementary European Search Report mailed Dec. 17, 2012 in EP 06844157.5, 4 pages.

\* cited by examiner

*Primary Examiner* — Chi Pham
*Assistant Examiner* — Mohammad Adhami
(74) *Attorney, Agent, or Firm* — Philip H. Albert; Davis Wright Tremaine LLP

(57) ABSTRACT

Serial clustering uses two or more network devices connected in series via a local and/or wide-area network to provide additional capacity when network traffic exceeds the processing capabilities of a single network device. When a first network device reaches its capacity limit, any excess network traffic beyond that limit is passed through the first network device unchanged. A network device connected in series with the first network device intercepts and will process the excess network traffic provided that it has sufficient processing capacity. Additional network devices can process remaining network traffic in a similar manner until all of the excess network traffic has been processed or until there are no more additional network devices. Network devices may use rules to determine how to handle network traffic. Rules may be based on the attributes of received network packets, attributes of the network device, or attributes of the network.

19 Claims, 3 Drawing Sheets

SERIAL CLUSTERING

CROSS-REFERENCES TO RELATED APPLICATIONS

This application claims priority to U.S. Provisional Patent Application No. 60/704,020, filed Jul. 28, 2005, and entitled "Serial Clustering," which is incorporated by reference herein for all purposes. This application is related to and incorporates by reference for all purposes U.S. patent application Ser. No. 10/285,315, Filed 30 Oct. 2002, entitled "Transaction Accelerator for Client-Server Communication Systems," (Hereafter "McCanne I"); U.S. patent application Ser. No. 10/640,405. Filed 12 Aug. 2003, entitled "Transparent Client-Server Transaction Accelerator," (Hereafter "McCanne III"); U.S. patent application Ser. No. 10/640,562, Filed 12 Aug. 2003, entitled "Cooperative Proxy Auto-Discovery and Connection Interception," (Hereafter "McCanne IV"); and U.S. patent application Ser. No. 10/640,459, Filed 12 Aug. 2003, entitled "Content Delivery for Client-Server Protocols with User Affinities using Connection End-Point Proxies," (Hereafter "McCanne V").

BACKGROUND OF THE INVENTION

This application relates the field of computer networking and systems and methods for processing network traffic. Network administrators often employ numerous different types of network devices to intercept network traffic between two or more entities on a communications network. These intercepting network devices may be used to monitor, optimize, filter, block, convert, or otherwise process the network traffic.

For example, many organizations operate at numerous different locations. Typically, these organizations use a separate local area network (LAN) at each location. The LANs for different locations are then connected by a wide area network (WAN) that enables users to access data located anywhere in the organization. Typically, the WAN connection is the weakest link in the organization's network infrastructure, having the slowest speed, the highest cost, and the lowest reliability.

To overcome many of these problems, organizations can use network acceleration appliances that improve WAN performance and reliability and reduce WAN utilization (and hence cost). Among the capabilities of network acceleration appliances is the ability to intercept and optimize network traffic at the TCP level. This allows appliances to address the impact of latency on TCP windowing mechanisms and allows for greater utilization of Wide Area Networks (WANs).

However, intercepting network devices such as network acceleration appliances often have limits on the amount of network traffic that can be intercepted and processed. For example, some network acceleration appliances have a limit to the number of TCP flows that can be handled, or other capacity constraints. Typically, when the number of TCP flows or other processing demands is expected to exceed the capacity of a single network device, network engineers split the network traffic into parallel data flows to a set of two or more intercepting network devices, such that each intercepting network device handles a subset of network traffic, and in combination, the set of intercepting network devices handles the full network traffic.

Unfortunately, splitting network traffic into two or more parallel data flows causes additional network complexity that often needs to be compensated for so that the network continues to operate correctly. In addition, such network traffic splitting requires accurate predictions of the network traffic to be effective and ensure that the network traffic load is evenly distributed. There is no straightforward way to simply add extra intercepting network devices to increase network traffic capacity and provide a safety margin of excess network capacity.

It is therefore desirable for a system and method to enable networks to easily increase the network traffic capacity of intercepting network devices, such as network acceleration appliances, without introducing undesirable network complexities. It is further desirable for the system and method to be easy to deploy and configured compared with prior network scaling techniques. Finally, although the motivation presented here is in terms of network acceleration appliances and limits on TCP flows, it is desirable for the system and method to be applicable to any type of intercepting network device and general network traffic, including network traffic using UDP or other datagram-oriented protocols.

BRIEF SUMMARY OF THE INVENTION

Serial clustering provides additional capacity when network traffic exceeds the processing capabilities of a single network device. In an embodiment of serial clustering, two or more network devices are connected in series. Network devices may be connected in series by local data network connections and/or wide-area data network connections.

In an embodiment, when a first network device reaches its limit of processing capacity, any excess network traffic beyond that limit is passed through the first network device unchanged. A subsequent network device connected in series with the first network device intercepts the excess network traffic. The subsequent network device will process the excess network traffic provided that it has sufficient processing capacity. If the network traffic exceeds the processing capacity of the first network device and the subsequent network device, the remaining excess network traffic can be transferred to one or more additional network devices in a similar manner until all of the excess network traffic has been processed or until there are no more additional network devices available to process excess network traffic.

In one embodiment, the network devices are each capable of processing a limited number of TCP flows. That is, the limit on each device is the count of TCP flows that can be handled. When a first network device reaches its TCP flow capacity, it passes new TCP flows through without any modifications. The first subsequent network device with spare capacity will then terminate the new TCP flow. In other embodiments, the limit on each device may be related to input (received) bandwidth, output (processed) bandwidth, CPU capacity, disk bandwidth used within the device, other similar limits well-known to those practiced in the arts, or combinations of these limits.

In an embodiment, rules are used by the network devices to determine at least in part how to handle network traffic. An embodiment of the network device identifies one or more rules matching a received network packet and applies these matching rules to determine how to handle the network packet. Rules allow network devices to ignore auto-discovery messages from network devices in the same serial cluster. Rules also help ensure that network connections are handled by the most appropriate network device on the network, such as the network device closest to the intended destination. Rules allow network devices to distribute network traffic between multiple network devices in a serial cluster to perform load balancing. Rules may be based on the attributes of received network packets, attributes of the network device, or attributes of the network.

BRIEF DESCRIPTION OF THE DRAWINGS

The invention will be described with reference to the drawings, in which.

DETAILED DESCRIPTION OF THE INVENTION

Figure 1:
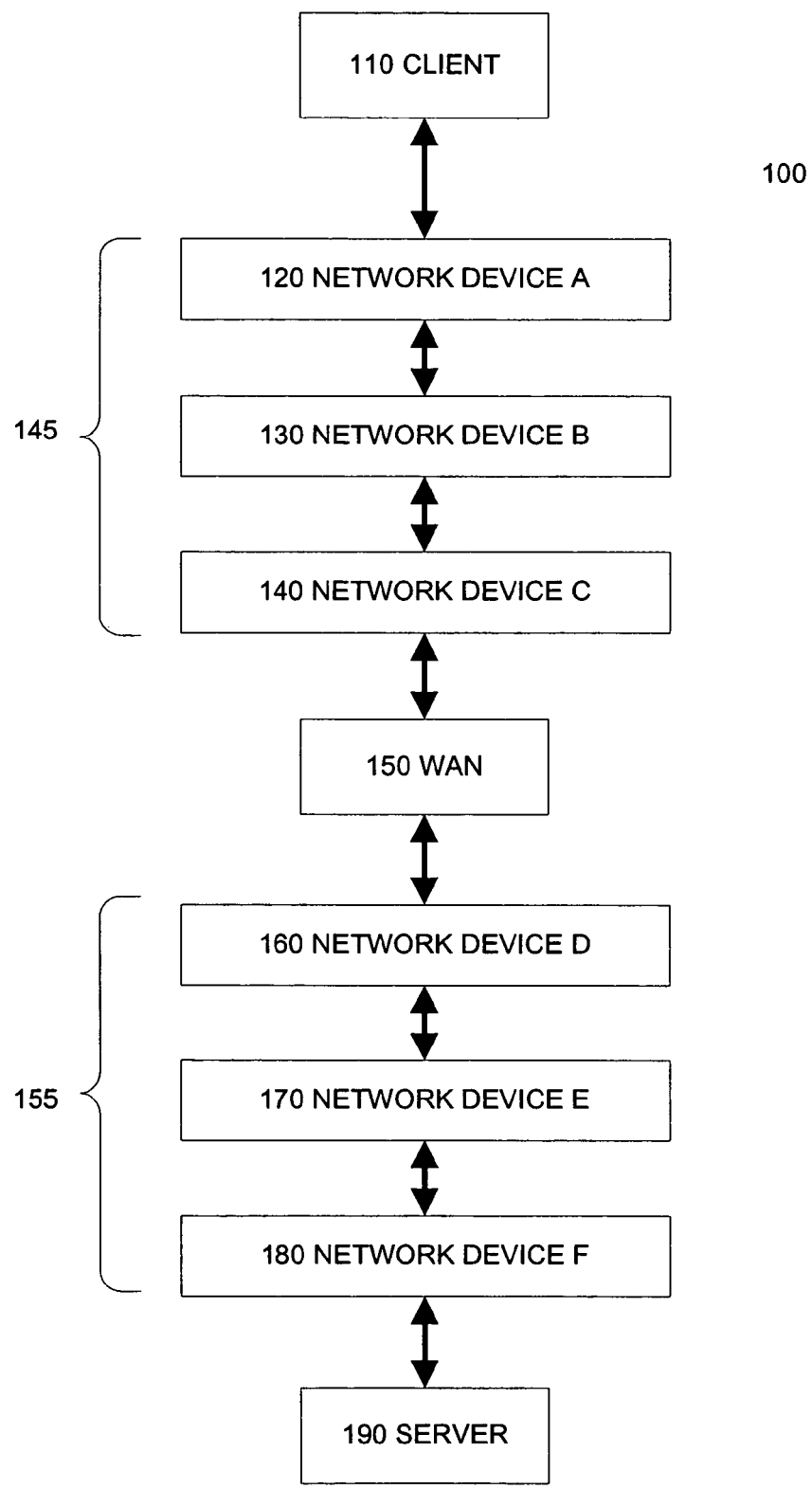
FIG. 1 illustrates an example network configuration including network devices in a serial or serial cluster arrangement according to an embodiment of the invention.

FIG. 1 illustrates an example configuration 100 of a network including network devices in a serial or cascade cluster arrangement according to an embodiment of the invention. In network configuration 100, a client 110 communicates with server 190 via wide-area network (WAN) 150. The client-server communication passes through client-side intercepting network devices 120, 130, 140 and through server-side intercepting network devices 160, 170, 180.

As discussed in detail below, the client-side intercepting network devices 120, 130, and 140 work together to process network traffic associated with client 110. The set of client-side intercepting network devices is referred to as a client-side serial cluster 145. Similarly, the set of server-side intercepting network devices 160, 170, 180 work together to process network traffic associated with server 190 and is referred to as a server-side serial cluster 155. In general, a serial cluster may include two or more intercepting network devices connected in series and configured to intercept and process network traffic associated with any number of clients and/or servers.

In an embodiment, the intercepting network devices include network acceleration appliances as described in McCanne I and McCanne III. However, embodiments of the invention are equally applicable to other types of network devices, including stand-alone intercepting network devices and intercepting network devices integrated with other devices or computer systems.

Although the example configuration 100 includes an equal number of intercepting network devices on the client and server sides of WAN 150, there may be any number of intercepting network devices on each side of the WAN 150 between client 110 and server 190. For example, network acceleration devices typically involve at least one intercepting network device on each side of the WAN connection 150. Therefore, an alternative version of example configuration 100 may replace serial cluster 145 with a single intercepting network device on the client side of the WAN 150. For other types of intercepting network devices and other applications, there may not be any intercepting network device on one side of the WAN connection 150 and a serial cluster of intercepting network devices on the other side of the WAN connection.

In an embodiment where intercepting network devices are located on opposite sides of the WAN connection 150, the intercepting network devices may perform auto-discovery as described in McCanne IV to locate and connect with peer network devices that are available and on the other side of the WAN connection 150. For network acceleration appliances, the auto-discovery mechanism may modify ordinary network connection setup routines to discover a suitable peer network acceleration appliance establish an inner channel network connection for optimized communication with that peer. In an additional embodiment, the configuration of a serial cluster includes configuring intercepting network devices to ignore auto-discovery probe messages from other intercepting network devices in the same serial cluster. In still a further embodiment, intercepting network devices are similarly configured not to intercept the inner connections created by other network devices in the same serial cluster.

According to this embodiment, example network configuration 100 configures network devices 120, 130, and 140 in serial cluster 145 to not respond to auto-discovery probe messages from each other and any other network devices in the same cluster. Additionally, example network configuration 100 configures network devices 120, 130, and 140 in serial cluster 154 to not intercept each others' inner connections. Similarly, network devices 160, 170, 180 in serial cluster 155 are configured to not respond to auto-discovery probe messages from each other and any other network devices in the serial cluster 155 and to not intercept each others' inner connections with network devices in other serial clusters, such as serial cluster 145.

In another embodiment, network devices in a serial cluster can be configured without the auto-discovery mechanism. In this embodiment, the first network device to receive a client communication responds if it has the capacity to handle the communication, or passes the client connection through to network devices behind it if it does not have the capacity to handle the communication. The first network device with the capacity to handle the communication acts as if it is the only network device in the serial cluster. For a connection initiated by client 110, network device 120 would handle the connection if it had capacity; if not it would pass through that connection initiation and all subsequent traffic on that connection to the network device behind it in the serial cluster 145, so that the connection initiation and subsequent associated network traffic would reach network device 130. Network device 130 will handle this connection if it has the capacity.

In the example of network acceleration appliances, network device 130 (or network device 140, if device 130 also does not have sufficient capacity) may handle the connection initiation request by establishing an inner connection with a peer network device in serial cluster 155 on the other side of the WAN connection 150, using a previously-configured target devices or list of target devices.

In an embodiments of system 100, the use of auto-discovery mechanisms may be symmetrical or assymetrical for network devices and serial clusters. As an example of asymmetrical use of auto-discovery mechanisms, serial cluster 155 may be configured to response to auto-discovery probe messages from any of the network devices in serial cluster 145. However, there is nothing that requires that the network devices in serial cluster 145 to response to auto-discovery probe messages from network devices in serial cluster 155 or anywhere else.

In a further embodiment, network devices in a serial cluster may follow rules that define how the network device should respond when it receives an auto-discovery probe message. In general, the rules can specify based on criteria that the network device should pass the auto-discovery probe message through (referred to as a pass-through rule) or alternatively accept and process the auto-discovery probe message (referred to as an accept rule). The criteria specified by rules can include the sender of the probe, the client IP/subnet, the server IP/subnet, and/or the server port.

In an embodiment, the criteria specified by rules need not be related to fixed attributes of network packets. For example, the presence or absence of byte patterns in the payload may be used as a means of determining whether a given flow should be handled, or whether a given packet should be handled. The specification of such byte patterns may use wild cards, regular expressions, pattern languages, or other such techniques that are well-known to those practiced in the arts. Still other criteria may also be used, such as choosing to process every nth connection initiated where n is a configurable value. And still other criteria may include an element of randomness, such as using a random or pseudorandom process to determine whether a given connection or packet should be handled. These criteria can be used to roughly load balance network traffic among multiple intercepting network devices in a serial cluster.

In an embodiment, an intercepting network device stores a rules table. The rules table is an ordered list of rules and associated criteria specifying the conditions or criteria under which the rule should be followed. In a further embodiment, an intercepting network device may evaluate the rules of the rules table in order and follows the first rule in which the criteria are satisfied. In other embodiments, the rules of a rule table may be processed in any order.

In an embodiment, a serial cluster may only use pass-through rules. As discussed above, a pass-through rule identifies network traffic to which optimizations are not applied by the intercepting network device. Instead, network traffic matching a pass-through rule is transferred through the network device unmodified. Pass-through rules can identify network traffic using source and destination netmask, ports, and other packet attributes. To ensure that inner connections created by other network devices in the same cluster are not intercepted by a network device, in-path rules can be used to pass-through connections originating from those network devices.

In another embodiment, an intercepting network device may use only accept rules that specify the types of network traffic to be processed by the intercepting network device. In still another embodiment, an intercepting network device can include both pass-through and accept rules to determine which network traffic to accept for processing and which network traffic to pass through unchanged.

In an embodiment, the rules may be specified with respect to one or more intercepting network devices in a serial cluster. The rules can be specified by a network administrator using an administration interface, for example via a local or remote console provided by an intercepting network device or using a management console.

Figure 2:
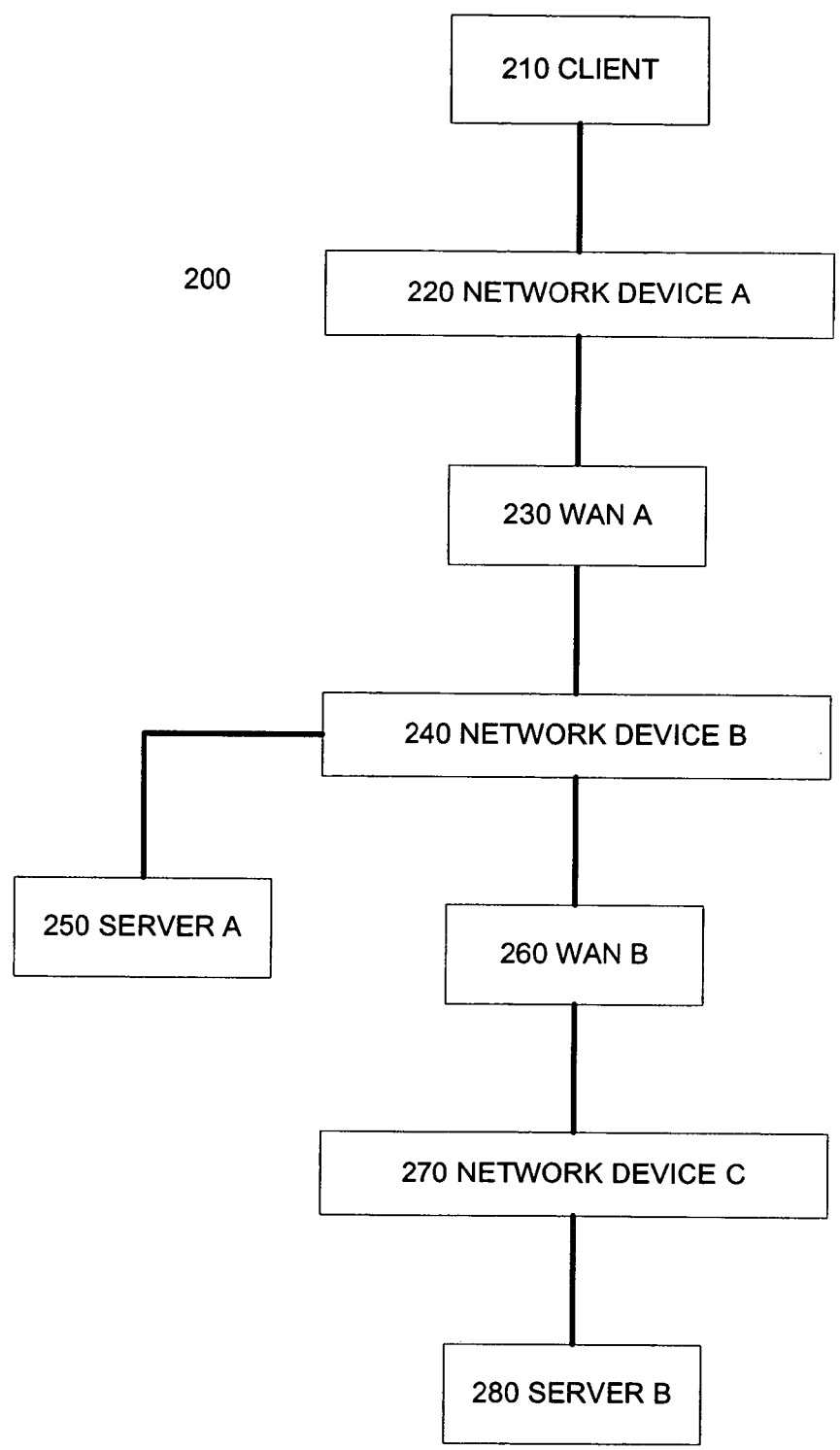
FIG. 2 illustrates another example configuration of network devices in a serial or cascade cluster arrangement according to an embodiment of the invention.

In an embodiment, rules can also define how to handle network traffic in more complicated network configurations, such as when network traffic between a client and server goes through multiple network devices in multiple sites before its destination. FIG. 2 illustrates another example configuration 200 of network devices in a serial or cascade cluster arrangement according to an embodiment of the invention. In network configuration 200, server 250 is on the same local area network as network device 240. Thus, network traffic between client 210 and server 250 must pass through network device 220, WAN connection 230, and network device 240. Additionally, network traffic between the client 210 and server 280 must pass through network device 220, WAN connection 230, network device 240, WAN connection 260, and network device 270.

For intercepting network devices, such as network transaction accelerators, that process network traffic using pairs of devices located at opposite ends of one or more WAN connections, it is most efficient to use the pair of intercepting network devices located closest to the source and destination of the network traffic. For example, network traffic between client 210 and server 280 would ideally be processed using the pair of intercepting network devices 220 and 270. If intercepting network device 240 were selected instead of network device 240 for handling traffic between client 210 and server 280, this network traffic would have to travel over WAN connection 260 in its unprocessed form, potentially decreasing network performance.

Without rules, intercepting network device 220 would require fixed target rules to specify that network traffic between the client 210 and server 280 should use devices 220 and 270: that is, network device 220 would need a rule indicating that traffic from 210 to 280 should be sent to 270, and network device 270 would correspondingly need a rule indicating that traffic from 280 to 210 should be sent to 220. For more complicated network topologies with multiple paths between servers and clients, fixed target rules would be required for all possible paths. Configuring and maintaining these fixed configuration rules for complex network topologies can be difficult, time-consuming, and error-prone.

In contrast, an embodiment of network device 220 using rules does not need any fixed target rules. Instead, rules on network device 240 can be defined that specifies that auto-discovery probe messages intended for server 250 should be accepted, while auto-discovery probe messages for other servers should be passed through. As a result of these rules, connection initiation request directed to server 250 would be intercepted by network device 240. Intercepting network device 240 would then handle network traffic from client 210, server 280, and any other entities on the network configuration 200 directed to server 250.

Conversely, the rules on network device 240 can specify that connections going to anywhere else would be passed through network device 240 subsequently intercepted by another network device, such as network device 270 for network traffic directed to server 280. The same rule on network device 240 is still useful no matter how complex the topologies on either side (above WAN 230 or below WAN 260) should become, with multiple clients, multiple servers, additional WANs, and additional network devices.

In a further example, any or all of the network devices 220, 240, and 270 may be replaced with a serial cluster of network devices to handle increased network traffic. In this case, the rules are used in a similar manner to select the appropriate serial cluster, rather than an individual intercepting network device, to be used to process network traffic for complex network topologies. Additional rules as described above may be used to manage network traffic within a given serial cluster of network devices, for example to ignore autodiscovery requests from devices in the same serial cluster, to select one of the network device within a serial cluster to process network traffic, or to load balance network traffic over the network devices within a serial cluster.

Figure 3:
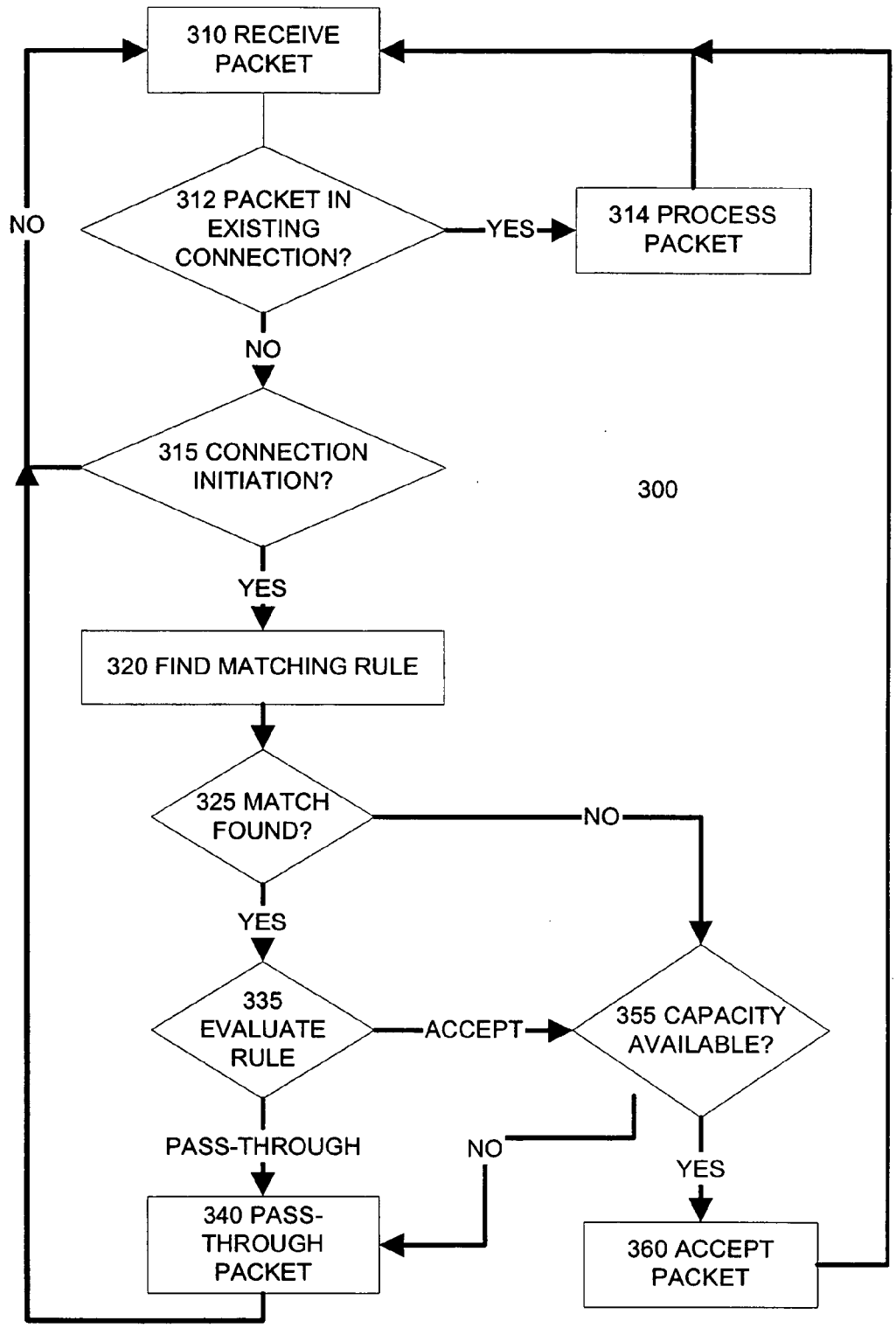
FIG. 3 illustrates a method of processing network traffic using rules on intercepting network devices according to an embodiment of the invention.

FIG. 3 illustrates a method 300 of processing network traffic using rules on intercepting network devices according to an embodiment of the invention. Method 300 can be utilized by intercepting network devices such as those shown in configurations 100 and 200, discussed above.

Step 310 receives a network packet. Step 312 determines if the received network packet is associated with a previously established network connection. If so, step 314 initiates the processing of the network packet. If the network packet is associated with a previously established network connection handled by the intercepting network device, then step 314 processes the network packet according to the function of the intercepting network device. Following step 314, method 300 returns to await the receipt of another network packet.

If the received network packet is not associated with a previously established connection, method 300 proceeds from step 312 to step 315. Step 315 evaluates the received network packet to determine if the network packet is requesting the initiation of a connection, such as a TCP connection, between two or more entities on the network. If the network packet is not requesting an initiation of a connection, step 315 passes the network packet on towards its intended destination unchanged. Then, method 300 proceeds from step 315 back to step 310 to await the receipt of another network packet.

If the received network packet is identified as requesting the initiation of a new connection, method 300 proceeds from step 315 to step 320. Step 320 attempts to find one or more rules of the network device that match the received network packet. In an embodiment, rules are evaluated in an order specified by a rule list and step 320 identifies the first rule matching the received network packet, if any. In alternate embodiment, step 320 may identify multiple rules matching the received network packet.

Step 325 determines whether step 320 has matched any of the network device's rules with the received network traffic. If there are no matching rules, method 300 proceeds to step 355 to determine if the network device has sufficient capacity to handle the connection request regardless. Conversely, if there are one or more matching rules, method 300 proceeds from step 325 to step 335 to evaluate one or more of the matching rules and determine whether the network packet should be accepted or passed through by the network device. As discussed above, rules can specify whether network packets should be accepted or passed through based on properties of the network packet as well as properties of previous network packets or of the network device.

If step 335 determines from the matching rules that the network packet should be passed through the network device without further processing, method 300 proceeds to step 340. Step 340 passes the received network packet on towards it destination without any further processing, allowing another network device to potentially handle the requested connection.

Following either step 325, if there is no rule matching the network packet, or step 335, if a matching rule directs the network device to accept the network packet, step 355 determines if the network device receiving the network packet has sufficient capacity to handle the connection requested by the network packet and its associated network traffic. In embodiments, the capacity of the network device may be based on a predetermined limit, such as the maximum number of TCP connections, or on a combination of factors or metrics measuring the capabilities and remaining capacity of the network device, such as the amount network traffic, input or output bandwidth, or memory, disk, processing resources required by other network traffic already handled by the network device. In further embodiments, rules may implement policies to control or limit network traffic based upon the source or destination addresses, network packet content, time of day, and the operational status and/or load of other network devices in a serial cluster. For example, in a first serial cluster, each intercepting network device could be implemented as a separate serial cluster, or nested serial cluster.

If step 355 determines that the network device has sufficient capacity to handle the processing the connection requested by the received network packet, step 360 accepts the network connection. Subsequent network traffic associated with this connection will be processed by the network device. Otherwise, step 340 passes the network packet through, allowing another network device to potentially handle the requested connection.

Depending upon the function of the intercepting network device, the network packet and network traffic associated with the network connection may be processed in numerous different ways. For network transaction accelerators, step 360 may analyzes and optimize the network connection, as described in McCanne I, McCanne III, and McCanne IV. For other types of intercepting network devices, step 360 may monitor, analyze, filter, block, modify, aggregate, or otherwise process network traffic according to the intended function of the intercepting network device. Regardless of the function of the intercepting network device and the type of processing of network traffic performed in step 360, embodiments of serial clustering allow multiple network devices to be utilized to increase processing capacity without complex configuration issues.

Following step 360 or 340, method 300 returns to step 310 to await the receipt of another network packet. Method 300 is an example of the operation of rules for intercepting network devices in a serial cluster. It is straightforward for one practiced in the arts to modify or elaborate method 300 to use alternative criteria, replacing or in addition to the rule processing described here.

Further embodiments can be envisioned to one of ordinary skill in the art after reading the attached documents. For example, although the invention has been discussed with reference to network acceleration appliances, it is equally applicable to any type of network device configured to intercept network traffic for monitoring, processing, filtering, blocking, or optimizing. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of processing network traffic, the method comprising:
   receiving a network packet by a network device;
   determining if the network packet is initiating a network connection;
   identifying, from among a plurality of rules, a matching rule matching the network packet in response to the determination that the network packet is initiating a network connection, wherein the identified matching rule is identified separately from at least one nonmatching rule not matching the network packet;
   evaluating the identified matching rule on the network packet in response to the identified matching rule matching the network packet to determine if the network packet should be accepted or passed-through, wherein at least one nonmatching rule is skipped in evaluating the network packet and the identified matching rule is evaluated in an order specified by a rule list;
   determining if there is sufficient processing capacity to handle the network packet and an associated network connection in response to the identified matching rule indicating that the network packet should be accepted;
   determining if there is sufficient processing capacity to handle the network packet and the associated network connection in response to the network packet not matching any rules;

accepting the network packet in response to the determination that there is sufficient processing capacity to handle the network packet;

selecting at least one of a plurality of additional devices to be a selected additional device, wherein selection is based on load balancing the network traffic among the plurality of additional devices;

passing the network packet through to the selected device in response to the identified rule indicating that the network packet should be passed-through; and passing the network packet through to the selected device in response to the determination that there is not sufficient processing capacity;

wherein the network device is connected with the selected device in a serial cluster, wherein the network devices in the serial cluster are configured to not respond to auto-discovery probe messages from each other.

2. The method of claim 1, further comprising:

determining if the network packet is associated with a previously accepted network connection;

accepting the network packet in response to the determination that the network packet is associated with the previously accepted network connection; and passing the network packet through in response to the determination that the network packet is not associated with the previously accepted network connection.

3. The method of claim 1, wherein the network connection includes a TCP connection.

4. The method of claim 1, wherein the identified matching rule indicates that the network packet should be passed-though if the network packet includes autodiscovery information associated with the selected device.

5. The method of claim 1, wherein the identified rule includes a criteria for evaluating the network packet.

6. The method of claim 5, wherein the criteria specifies a condition for accepting the network packet.

7. The method of claim 5, wherein the criteria specifies a condition for passing-through the network packet.

8. The method of claim 5, wherein the criteria is based on a property of the network packet.

9. The method of claim 5, wherein the criteria is based on a property of the network device.

10. The method of claim 1, wherein the identified matching rule indicates that the network packet should be accepted if the network packet is directed to a network entity associated with the network device.

11. The method of claim 10, wherein the network entity is a client computer.

12. The method of claim 10, wherein the network entity is a server computer.

13. The method of claim 10, wherein the network entity is connected with the network device via a local data network connection.

14. The method of claim 1, wherein determining if there is sufficient processing capacity to handle the network packet and the associated network connection includes determining if accepting the network packet would exceed a maximum number of network connections for the network device.

15. The method of claim 1, wherein determining if there is sufficient processing capacity to handle the network packet and the associated network connection includes determining if the network packet and the associated network connection would exceed a maximum bandwidth of the network device.

16. The method of claim 1, wherein receiving the network packet includes intercepting the network packet on a data network as the network packet travels towards a destination.

17. The method of claim 1, wherein receiving the network packet includes receiving the network packet forwarded from an additional network device.

18. The method of claim 1, wherein the network device and the selected device are connected via a local data network.

19. The method of claim 1, wherein the network device and the selected device are connected via a wide-area data network.

* * * * *